July 8, 1969 L. GASSER 3,454,726
KEY DIALLING SYSTEM CAPABLE OF TRANSMITTING SPECIAL
SIGNALS OVER A LOOP IN THE CALL CONDITION
Filed June 30, 1965

INVENTOR
LORENZ GASSER

BY

ATTORNEY

United States Patent Office 3,454,726
Patented July 8, 1969

3,454,726

KEY DIALLING SYSTEM CAPABLE OF TRANSMITTING SPECIAL SIGNALS OVER A LOOP IN THE CALL CONDITION

Lorenz Gasser, Gerlingen, Germany, assignor to International Standard Electric Corporation Filed June 30, 1965, Ser. No. 468,409
Claims priority, application Germany, July 10, 1964, St 22,384
Int. Cl. H04m 1/26, 1/00
U.S. Cl. 179—90 4 Claims

ABSTRACT OF THE DISCLOSURE

A key dialling system incorporates a voice frequency oscillator which is activated by closure of contacts by the keys. In order to connect the key dialling system to a register under such circumstances, e.g., while a call is being transmitted, a particular interruption is necessary in the closed loop. This invention provides an RC circuit which is connected to the control terminal of the oscillator and to certain keys to introduce an interruption in the closed loop of particular duration before the oscillator is turned on.

Figure 1:
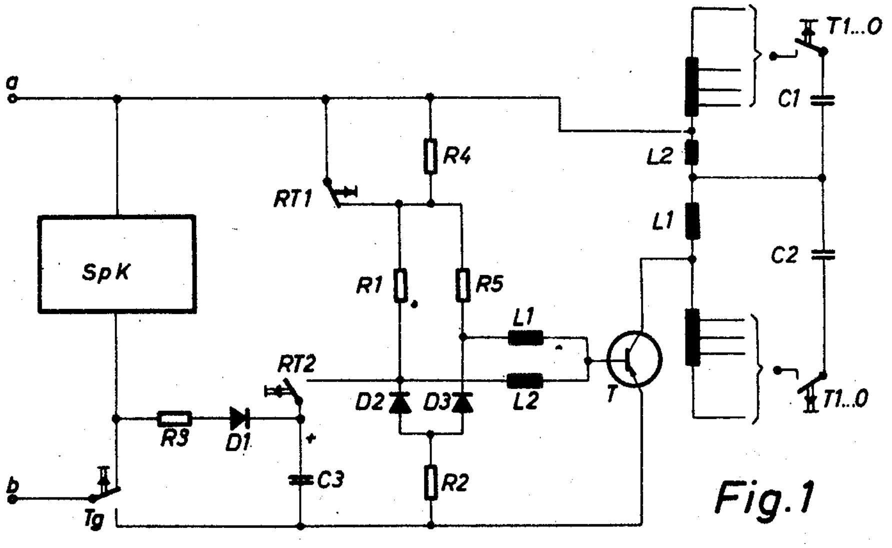

The invention relates to a voice-frequency key dialling system which functions without direct current dial pulse supervising signals in telecommunication and particularly telephone exchanges.

There are different voice-frequency key dialling methods known which maintain a certain level of reliability against undue speech influence by a separate selection of the signal code and the operation of voice-frequency receivers equipped with speech immunity circuits.

These methods have the great advantage that the signal frequencies in the voice-frequency range uniquely mark the code signal transmitted. A transmission route cannot limit this signalling. The voice frequency receivers required to receive the code signals are accommodated in registers which are connected to the links while a connection is being established. Since the entire evaluation of the code signal is made in the register the connecting link can be constructed very simply.

In telephone systems it is, however, occasionally necessary to initiate signals during the period of an existing connection. In conjunction herewith the calling of a certain operator's position or similar call is referred to. Since the register in such an operating condition is already disconnected from the link, code signals emitted from the subscriber station cannot be evaluated in the link.

It is the object of the invention to extend the voice-frequency key dialling method without using direct current dial pulse supervising signals in such a way that even during the call condition special signals can be transmitted and evaluated at any time. The expenditure in the subscriber stations and in the links should be kept small and the high transmission speed of such a key dialling method without direct current dial pulse supervising signal should not be reduced. The voice-frequency key dialling method according to the invention is characterized in that during the signalling a transistor oscillator is inserted into the loop circuit to transmit special signals—for example requesting of a register—via contacts of separate keys or contact combinations of several dialling keys in such a way that only after a predetermined time said oscillator starts to oscillate, thereby representing a loop interruption during this period. A short-time loop interruption, known per se, prior to the actual code signal is introduced when for signalling purposes a register must be connected first. This is initiated by actuating a separate key or by a combination of dialling keys. A momentary loop interruption can be discerned in the link from a connecting release through simple switching means. When a connection is released the loop interruption is constantly applied, i.e., at least for a time which is longer than the predetermined momentary loop interruption. Since the normal key dialling code signals are preceded by a momentary loop interruption the signalling speed for key dialling is not influenced. When the different special keys or various combinations of dialling keys are actuated different special signals can be transmitted. In any case, by the momentary loop interruption a register is connected with the dial pulse receiving facilities whereupon the succeeeding voice-frequency special signal is evaluated in said facilities.

A circuit arrangement to carry out the voice-frequency key dialling method according to the invention is characterized in that energy storage is provided in the subscriber station which is charged during the call condition on the voltage drop at the speech circuit. When actuating a separate key or a combination of dialling keys, said energy storage is discharged into the control circuit of the transistorized oscillator, and a voltage drop occurs in said control circuit which blocks the transistor of the oscillator till the energy storage is completely discharged.

Figure 2:
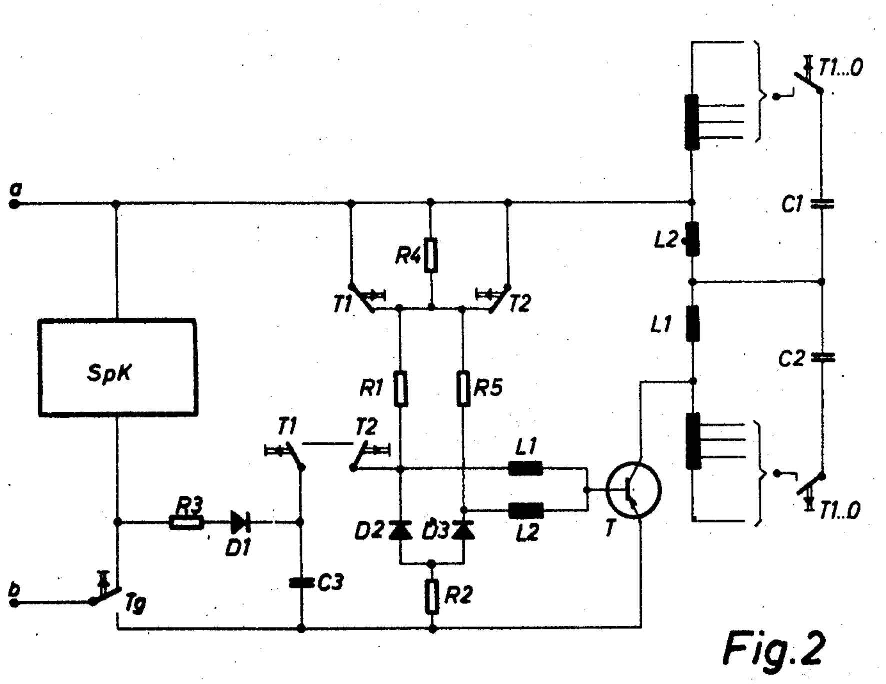

The invention is now described in detail with reference to two examples, shown on the accompanying drawing, wherein:

FIG. 1 shows the circuit arrangement of a subscriber station in which special signals are formed by actuating other than normal dialling keys, and FIG. 2 shows the circuit arrangement of a subscriber station in which special signals are formed by actuating two defined dialling keys.

In FIG. 1 the speech circuit S*p*K of the subscriber station is indicated only by a block, because it is unimportant for the idea of the invention. The loop is closed via the *a*- and *b*-wire and via said speech circuit S*p*K, as soon as the subscriber lifts the handset.

Into this loop circuit a switch-over contact T*g* is inserted which disconnects the speech circuit S*p*K whenever a key is actuated, and connects the transistorized oscillator. Said oscillator represents with its transistor T a twin-frequency generator, having two oscillating circuits L1, C1 and L2, C2. Via the contacts of the dialling keys T1 to T0 both oscillating circuits are set in compliance with the signalling frequencies desired. The oscillating circuit capacitors C1 and C2 are thereby connected to the corresponding tappings of the oscillating circiut coil L1 and L2. The transistor T is biased via the control circuit RT1//R4, R1, D2, R5, D3, R2 which renders the transistor conductive. Via the feedback windings in the base circuit of the transistor the oscillating is initiated and maintained so that the desired code signal can be transmitted over the line *a*, *b*.

When, however, the special key RT1–RT2 is actuated the oscillator does not start at once. Via the resistor R3 and the diode D1 as well as via the aforementioned control circuit in the transistor input circuit the capacitor C3 is charged to the voltage drop occurring in the speech circuit S*p*K when the loop is closed. When the separate key RT1–RT2 is actuated the capacitor C3 is discharged through contact RT2 via the resistors R1 and R4. The voltage drop thereby occurring in the control circuit opposes the opening voltage of the control voltage divider, now inserted into the loop circuit and prevents the transistor T from receiving voltage to make it conductive. Therefore, the oscillator does not oscillate until the capacitor C3 has been discharged to such an extent that the control voltage of the control circuit predominates and the transistor T becomes conductive. During this period the loop circuit is practically interrupted, because the control circuit with the resistors R4, R1 and R2 is very high ohmic. The duration of the loop interruption is determined by the dimension of the capacitor C3 and essentially by the high-ohmic resistor R4 in the discharging circuit. The resistor R4 is short-circuited when voice-frequency key dialling code signals are emitted via the dialling keys T1 to T0, so that the transistor T receives sufficient control current. Since the special key RT1–RT2 is actuated only to transmit the separate signal, the delay circuit with the loop interruption becomes effective only when said special signal is given. When actuating one of the dialling keys T1 to T0 the transistor T immediately becomes conductive and the frequency combination set is transmitted. The arrangement can also be extended so that several separate keys are provided which all control the delay circuit with loop interruption and, moreover, further key contacts set a differing voice frequency code signal which is transmitted after the momentary loop interruption.

FIG. 2 shows another example for special signal transmission in voice-frequency key dialling. The arrangement differs only by the different actuation of the delay circuit. For the special signal transmission known separate keys are provided, because the dialling keys T1 to T0 are used for said signalling. If only one of the keys T1 to T0 is actuated the voice-frequency code signal is transmitted without direct current dial pulse supervising signal in a way known to the art. If, however, a certain combination of keys is actuated a new signal can be produced. The example, represented in FIG. 2, shows that the storing capacitor C3 is discharged only when the dial keys T1 and T2 are actuated simultaneously. Then the transistorized oscillator oscillates with a certain delay to provide a previously referred to momentary loop interruption.

The following code signal is determined by the position of contacts T1 and T2 in the oscillating circuits. It should thereby be considered that, when actuating two keys, short-circuiting of parts of the oscillating coil is avoided. This can be achieved in a most simple manner in that the switching contacts are arranged in a chain circuit which warrants that only one contact remains connected with the oscillating circuit capacitor and connects said capacitor with the coil. If different special signals shall further be transmitted, similar contact combinations shall be provided in the control circuit of the transistor and in the starting circuit of the energy storage capacitor C3.

In both examples a momentary loop interruption is provided when transmitting special signals. Since at the moment of signalling no voice-frequency receiving facility is connected to the line, switching means are provided in the link of the system which can distinguish such a momentary loop interruption from the release of a connection. A register is thereupon again requested via said switching means, which register can receive and evaluate the voice-frequency code signal following the loop interruption.

I claim:

1. A voice-frequency key dialling telecommunication system equipped for sending an open loop pulse having a dial pulse receiving facility with a register, subscriber circuits, loop circuits including two wire lines extending between said subscriber circuits and said pulse receiving facility and comprising transistorized oscillator means, a plurality of keys having contact means, means including related ones of said contact means for inserting said oscillator into a loop circuit while the loop circuit is in the call condition, said means for inserting said oscillator including delay means for introducing a short-time loop interruption prior to insertion of the oscillator into the loop.

2. The system of claim 1 and means responsive to the actuation of said keys in different combinations for producing different special signals.

3. The system of claim 2, wherein link means are provided, and switching means in said links which can discern the short-time loop interruption from a release of the connection.

4. The system of claim 3 wherein said subscriber circuit includes a speech circuit, said delay means comprises energy storage means provided in the subscriber circuit, means are provided for charging said energy storage means during the call condition to the voltage drop at the speech circuit, means are provided responsive to the actuation of a special key of said plurality of keys for discharging said energy storage means in the control circuit of the transistorized oscillator, and means in said control circuit blocks the transistor of the oscillator until the energy storage means is discharged.

References Cited

UNITED STATES PATENTS

| | | | |
|---|---|---|---|
| 1,221,166 | 4/1917 | Goodrum | 179—18 |
| 2,332,290 | 10/1943 | Baumfalk | 179—27 |
| 2,951,911 | 9/1960 | Van Lottum | 179—90 |
| 3,008,009 | 11/1961 | Van Lottum | 179—90 |
| 3,065,305 | 11/1962 | Nilsson et al. | |

FOREIGN PATENTS

| | | |
|---|---|---|
| 1,172,737 | 6/1964 | Germany. |

KATHLEEN H. CLAFFY, *Primary Examiner.*

A. H. GESS, *Assistant Examiner.*

U.S. Cl. X.R.

179—84